United States Patent
Chang

(10) Patent No.: US 9,380,480 B2
(45) Date of Patent: Jun. 28, 2016

(54) MINIMIZATION DRIVE TEST WITH REDUCED WIRELESS DEVICE MEMORY USAGE

(75) Inventor: Henry Chang, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 1001 days.

(21) Appl. No.: 13/218,303

(22) Filed: Aug. 25, 2011

(65) Prior Publication Data

US 2013/0053017 A1    Feb. 28, 2013

(51) Int. Cl.
*H04W 24/00* (2009.01)
*H04W 24/10* (2009.01)

(52) U.S. Cl.
CPC .................................. *H04W 24/10* (2013.01)

(58) Field of Classification Search
CPC ..... H04W 24/10; H04W 24/00; H04W 24/08; H04W 16/18; H04L 1/0026; H04B 17/24; H04B 17/00; H04B 17/309
USPC ........... 455/423, 422.1, 67.11, 466, 434, 436, 455/517, 424, 456.1; 370/252, 329; 709/224
See application file for complete search history.

(56) References Cited

U.S. PATENT DOCUMENTS

| | | | | |
|---|---|---|---|---|
| 6,985,736 | B1* | 1/2006 | Aalto | 455/447 |
| 7,742,776 | B2* | 6/2010 | Annunziato et al. | 455/456.2 |
| 8,306,538 | B2* | 11/2012 | Lee et al. | 455/436 |
| 2003/0185365 | A1* | 10/2003 | Mansfield | 379/142.01 |
| 2009/0190692 | A1* | 7/2009 | Aniruddhan et al. | 375/295 |
| 2010/0091667 | A1* | 4/2010 | Kazmi | H04L 43/0829 370/252 |
| 2010/0190488 | A1* | 7/2010 | Jung | H04W 24/10 455/424 |
| 2010/0197239 | A1* | 8/2010 | Catovic et al. | 455/67.11 |
| 2010/0295473 | A1* | 11/2010 | Chemel et al. | 315/294 |
| 2010/0330921 | A1* | 12/2010 | Kim et al. | 455/67.11 |
| 2011/0194441 | A1* | 8/2011 | Jung et al. | 370/252 |
| 2011/0201279 | A1* | 8/2011 | Suzuki | H04W 24/10 455/67.11 |
| 2011/0250910 | A1* | 10/2011 | Lee et al. | 455/466 |
| 2011/0287793 | A1* | 11/2011 | Tenny et al. | 455/507 |

(Continued)

FOREIGN PATENT DOCUMENTS

| | | |
|---|---|---|
| EP | 2360962 A2 | 8/2011 |
| WO | 2010133138 A1 | 11/2010 |

(Continued)

OTHER PUBLICATIONS

Research in Motion et al, "Logged MDT measurement configurations," 3GPP draft: R2-103769, 3rd Generation Partnership Project (3GPP) TSG RAN WG2, Jun. 28-Jul. 2, 2010, Stockholm, Sweden.

(Continued)

*Primary Examiner* — Mahendra Patel

(57) ABSTRACT

A mobile wireless communication device efficiently uses memory when performing a minimization drive test (MDT) by storing less than all of the MDT measurements. The mobile wireless communication device receives a control signal comprising MDT configuration parameters indicating at least a measurement interval. When executing the MDT, the mobile wireless communication device measures a signal characteristic of measurement signals in accordance with the MDT configuration parameters to generate a number of measurements for a measurement period. Rather than storing all of the measurements, only a number of log values corresponding to the measurements are stored in memory, where the number of log values is less than the number of measurement values.

15 Claims, 6 Drawing Sheets

(56) References Cited

U.S. PATENT DOCUMENTS

| | | | |
|---|---|---|---|
| 2012/0009918 A1* | 1/2012 | Wu | 455/423 |
| 2012/0155390 A1* | 6/2012 | Ou et al. | 370/328 |
| 2012/0307669 A1* | 12/2012 | Kim | H04W 24/10 370/252 |
| 2012/0309404 A1* | 12/2012 | Suzuki et al. | 455/450 |
| 2012/0309431 A1* | 12/2012 | Bodog | 455/456.6 |
| 2012/0329402 A1* | 12/2012 | Ren et al. | 455/67.11 |
| 2013/0109423 A1* | 5/2013 | Iwamura | H04W 24/10 455/512 |
| 2014/0056169 A1* | 2/2014 | Jung et al. | 370/252 |
| 2014/0087716 A1* | 3/2014 | Vaderna | H04L 43/50 455/422.1 |

FOREIGN PATENT DOCUMENTS

| | | |
|---|---|---|
| WO | 2011136611 A2 | 11/2011 |
| WO | 2012113435 A1 | 8/2012 |

OTHER PUBLICATIONS

New Postcom, "Adaptable logging periodicity and selective logging," 3GPP draft; R2-122332, 3rd Generation Partnership Project (3GPP) TSG RAN2, May 21-25, 2012, Prague, Czech Republic.

Samsung: "Coverage optimization for Rel-11 MDT," 3GPP draft; R2-115052, 3rd Generation Partnership Project (3GPP) TSG RAN WG2, Oct. 10-14, 2011, Zhuhai China.

* cited by examiner

MINIMIZATION DRIVE TEST WITH REDUCED WIRELESS DEVICE MEMORY USAGE

FIELD

This invention generally relates to wireless communications and more particularly to minimization drive tests (MDT) with reduced memory usage.

BACKGROUND

Wireless communication systems operating in accordance with various standards employ minimization drive tests (MDT) to improve wireless communication coverage. When new base stations are deployed, drive tests are performed before and after service activation of the new cell (base station). Initially, downlink/uplink (DL/UL) coverage measurements of the new cell and neighbor cells are made in the intended area of coverage improvement. During this phase, initial area tuning is performed (e.g. selection of an appropriate antenna for the new cell, adjustment of antenna tilting of the new cell and neighbor cells, etc.). Service with the new cell will be started after such initial tuning. Drive tests are performed to collect more extensive data of DL/UL coverage measurements in the intended area to confirm that adequate DL/UL coverage is being provided. In order to reduce the rigorous drive tests that are needed to collect downlink/uplink coverage measurements Minimization of Drive Test (MDT) are used to gather data. Using an MDT procedure, measurements can be collected from user equipments (UEs) (mobile devices) without the need for the extensive drive tests. As a result, the MDT can reduce network maintenance costs for operators, ensure a faster optimization cycle resulting in higher customer satisfaction and help to reduce the carbon emission to protect the environment. Furthermore, MDT enables operators to collect measurements from areas which are not accessible for drive tests (e.g. narrow roads, forests, private land/house/office). Other uses of MDT include mobility, capacity, QoS optimizations. In order to collect measurements from the mobile communication device, the device must be configured with the MDT parameters. The MDT configuration parameters typically include indicators of what parameters to measure, the time stamp of the log, how long the measurement should last and what parameters to report. Once the mobile device is configured with MDT parameters, the device is required to measure and log the pilot strength information once every period depending on the configured periodicity (logging interval). Even if the device is stationary and the pilot strength is relatively unchanged, the device is typically required to measure and log at every time interval.

SUMMARY

A mobile wireless communication device efficiently uses memory when performing a minimization drive test (MDT) by storing less than all of the MDT measurements. The mobile wireless communication device receives a control signal comprising a MDT configuration parameter indicating at least a measurement interval. When executing the MDT, the mobile wireless communication device measures a signal characteristic of measurement signals in accordance with the MDT configuration parameters to generate a number of measurements for a measurement period. Rather than storing all of the measurements, only a number of log values corresponding to the measurements are stored in memory, where the number of log values is less than the number of measurement values.

DETAILED DESCRIPTION

As discussed above, conventional MDT techniques require the mobile wireless communication device to log and store values at every measurement time dictated by the logging interval parameter. In accordance with the examples described herein, however, the use of memory resources is reduced by selecting less than every measurement value. The log values that are stored may be selected measured values or may be calculated values that represent the measured values. Any of several techniques may be used to generate the log values. The selection and calculation of the log values, for example, may be based on a predetermined scheme or may be based on a trigger event such as exceeding a threshold.

Figure 1:
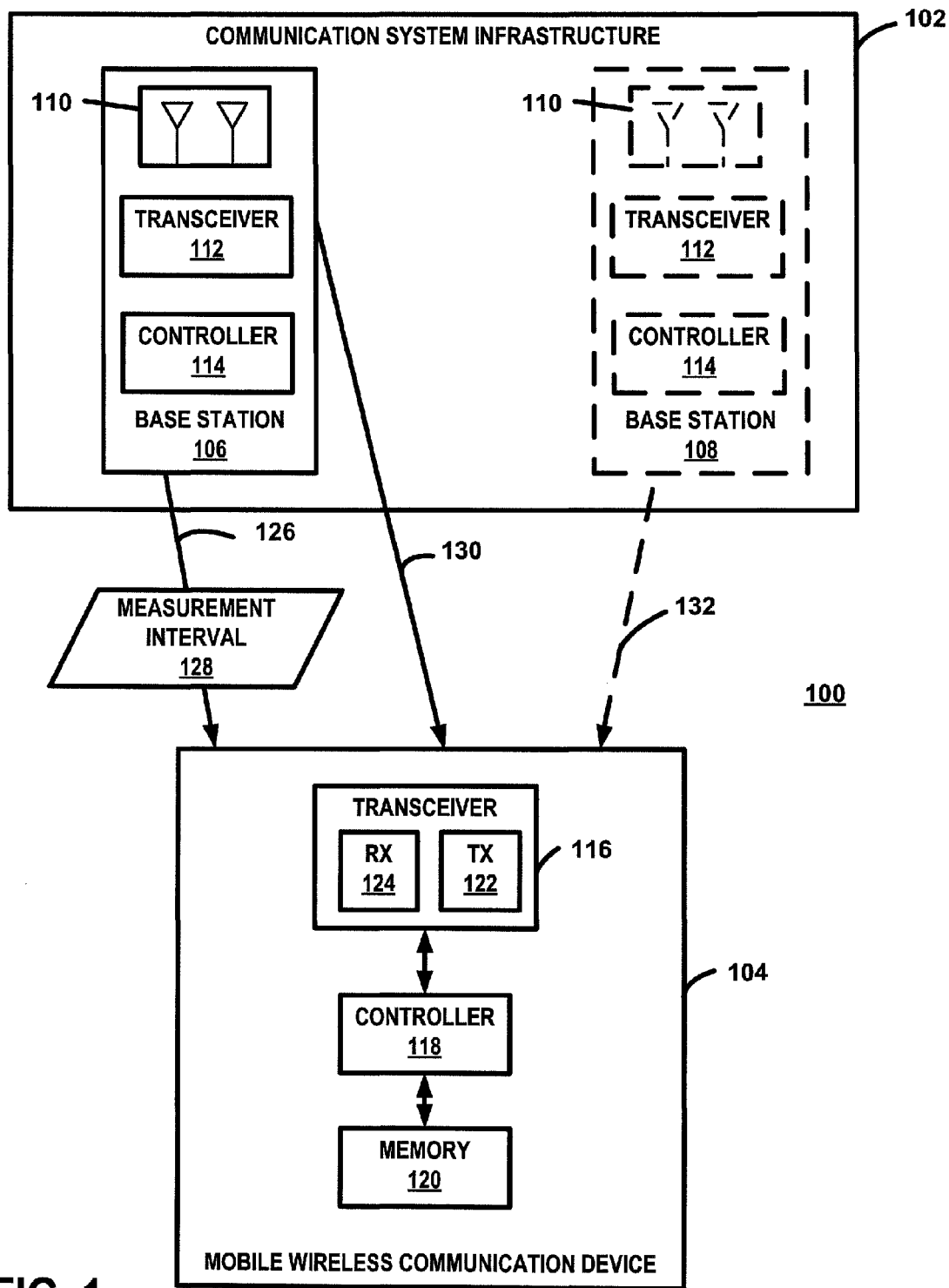
FIG. 1 is a block diagram of a communication system.

FIG. 1 is a block diagram of a communication system 100 including communication infrastructure 102 and mobile wireless communication devices 104. The communication system infrastructure 102 includes at least one base station 106 and, in most implementations, includes several base stations 106, 108, controllers, and backhaul equipment (not shown). The base stations 106, 108 transmit and receive control and data signals to and from mobile wireless communication devices 104 and may be referred to as eNodeBs, eNBs, transceiver stations, access points, and other terms depending on the particular type of system. Each base station 106, 108 includes at least an antenna system 110, a transceiver 112, and a controller 114. Although the antenna system 110 may only include a single antenna, the antenna system 110 may include multiple elements or antennas and is typically controllable such that the antenna radiation and reception patterns can be adjusted. The transceiver 112 includes electronics for transmitting downlink signals and receiving uplink signals through the antenna system 110. The controller 114 is any combination of electronics, processors, and/or processor arrangements that runs code to perform base station functions described herein as well as facilitate the overall operation of the base station. For the examples discussed herein, the communication system 100 operates in accordance with 3rd Generation Partnership Project (3GPP) standards and protocols except for the distinctions discussed with reference to Minimization of Drive Test (MDT) operations. Therefore, the discussed examples are consistent with systems such as E-UMTS and LTE.

The MDT procedure is discussed with reference to a single mobile wireless communication device 104 for the examples herein although multiple devices may perform the MDT procedure for a particular coverage region. The mobile wireless communication devices 104 include devices such as wireless telephone devices, sometimes referred to as handsets or cell phones, as well as other devices such as wireless personal digital assistants (PDAs) laptop computers, tablets and wireless modems. Also, the mobile wireless communication devices are sometimes referred to as user equipment (UE) in some types of systems.

Each mobile wireless communication device 104 includes at least a transceiver 116, a controller 118, and memory 120. A transmitter 122 and receiver 124 of the transceiver 116 include electronics for transmitting and receiving signals, respectively. The transmitter 122 and receiver 124 may include any combination of hardware, software, and/or firmware. In most circumstances, the mobile wireless communication devices 104 also include input and output devices such as, for example, visual displays, keyboards, touch screens, microphones and speakers (not shown).

As discussed above, the MDT procedure provides a means for collecting data that can be used to optimize system performance. As is known, antennas 110 and other equipment at one or more base stations 106, 108 are adjusted based on the data provided by mobile wireless communication devices 104 and acquired during the MDT procedure. The information regarding the quality of received signals provided by the mobile wireless communication devices 104 is used to improve communication coverage in the desired areas. Adjustments may be made to multiple base stations 106, 108 to reduce interference and increase signal power within the desired regions. For example, the antenna of a serving base station 106 providing the communication service may be adjusted to increase signal strength in a service area of the base station 106 and the antenna 110 of a nearby interfering base station 108 may be adjusted to reduce signal from the interfering base station 108 in the service area of the serving base station 106.

The communication system infrastructure 102 transmits a control signal 126 that includes MDT configuration parameters. In accordance with conventional techniques, one of the MDT configuration parameters is a logging interval parameter. The logging interval parameter indicates the time between MDT measurements obtained by the mobile wireless communication device 104. The logging interval parameter, therefore, indicates to the mobile wireless communication device 104 how often to perform MDT measurements. In accordance with the invention, the mobile wireless communication device 104 takes measurements at intervals as indicated by the logging interval parameter but stores less than all of the measurements in memory 120. As a result, the mobile wireless communication device 104 does not necessarily "log" the measurements in accordance with the logging interval parameter. In order to avoid confusion, therefore, the MDT parameter referred to as a "logging interval" in standards and conventional systems is referred to as a measurement interval, herein. Accordingly, the MDT measurement interval parameter 128 (often referred to as a logging interval parameter in conventional systems) is transmitted by the communication system infrastructure 102 to the mobile wireless communication device 104. Although any of various signals can be used to transmit the MDT measurement interval parameter 128, the parameter 128 is transmitted by a base station 106 via a control signal 126 for the example. An example of a suitable technique includes transmitting the MDT measurement interval parameter 128 within a Logged-MeasurementConfiguration message over the Radio Resource Control (RRC) message through dedicated signaling in accordance with LTE standards. The Standards currently limit the logging interval (measurement interval) to a value between 1280 milliseconds and 61440 milliseconds.

After receiving the MDT configuration parameters, the mobile wireless communication device 104 executes the MDT procedure. Signals 130, 132 that are measured by the mobile wireless communication device 104 are referred to herein as measurement signals 130, 132. Although other signals may be used in some situations, the measurements signals 130, 132 are typically reference signals such as pilot signals. The controller 118 evaluates measurement signals 130, 132 received by the receiver 124 to measure a signal characteristic. The signal characteristic may be any parameter, value, or characteristic that indicates, or that can be used to calculate, the signal quality of the measurement signal 130. In accordance with conventional MDT procedures, the signal characteristic is a signal strength or power related value such as Reference Signal Received Power (RSRP) or Reference Signal Received Quality (RSRQ). The second base station 108 and the associated measurement signal 132 are drawn with dashed lines to indicate that typically the measurement signal 130 is received from a single base station 106 although, in some situations, the measurement signal 132 from another base station 108 may be used for the MDT procedure.

Figure 2:
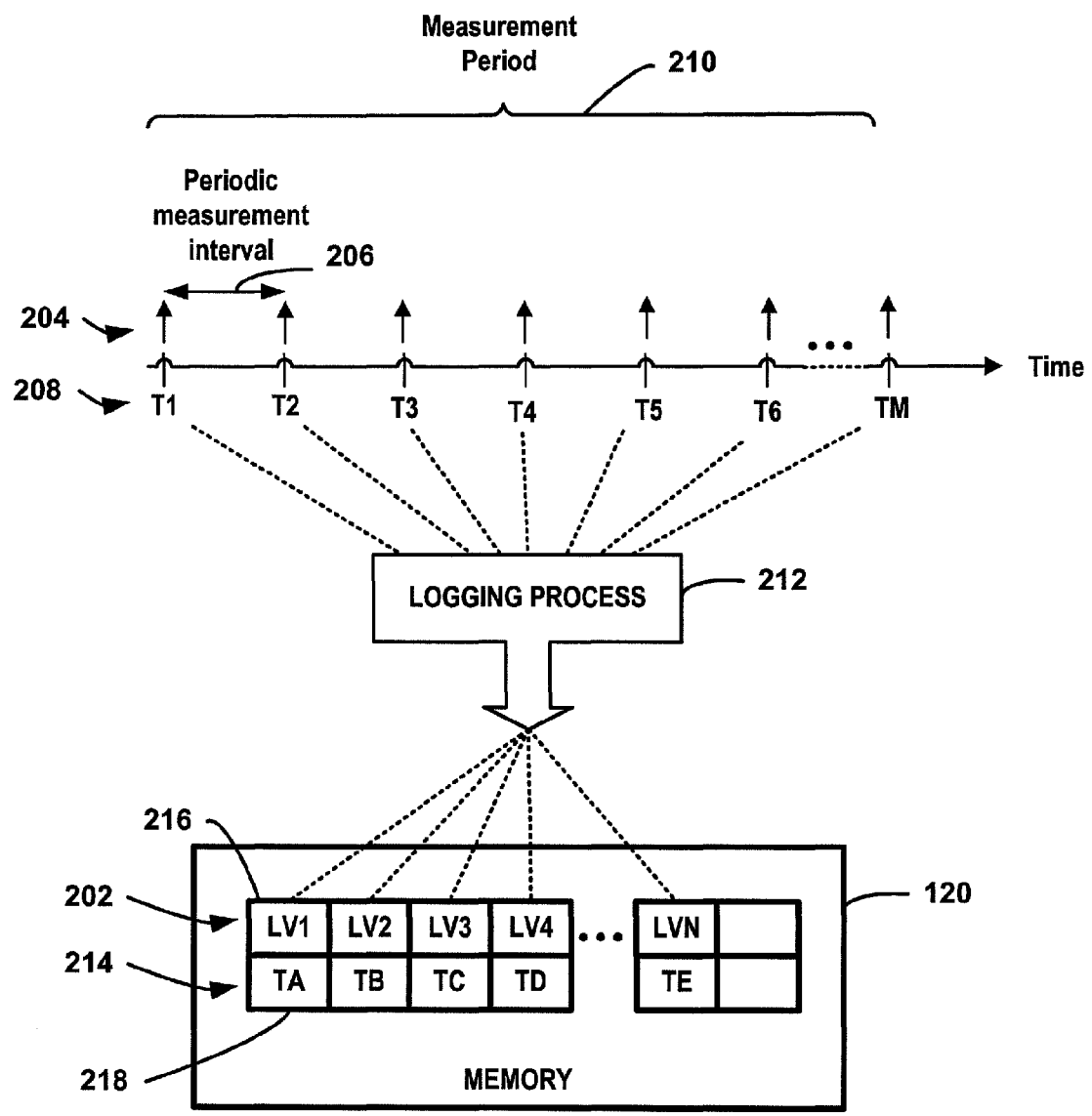
FIG. 2 is a diagram of logging values corresponding to MDT measurements.

FIG. 2 is a diagram of logging values 202 corresponding to MDT measurements 204. The controller 118 applies the MDT configuration parameters to obtain measurements of the measurement signals (pilot signals) 130. Accordingly, the periodic measurement interval 206 is the measurement interval indicated by the measurement interval parameter 128. Each measurement occurs at a measurement time of a plurality of measurement times 208 within a measurement period 210. The controller 118 applies a logging process 212 to generate log values 202 from measurements 204 taken within a measurement period 210. For the example, M measurements are taken within the measurement period 210 where M is greater than two. The number of log values, N, corresponding to the M measurements is less than the number of measurements, M. Stated differently, the log number (N) of measurements representing measurements within a measurement period 210 is less than the measurement number (M) of measurements taken within that measurement period 210.

Each log value is stored in memory 120 and associated with a time indicator (such as a time stamp) 214 that corresponds to one of the measurement times 208. Therefore, a first log value, LV1 216, is stored in memory 120 and associated with a first time stamp, TA, 218 where TA corresponds to a measurement time 208 such as T1 or T2, for example.

Figure 3:
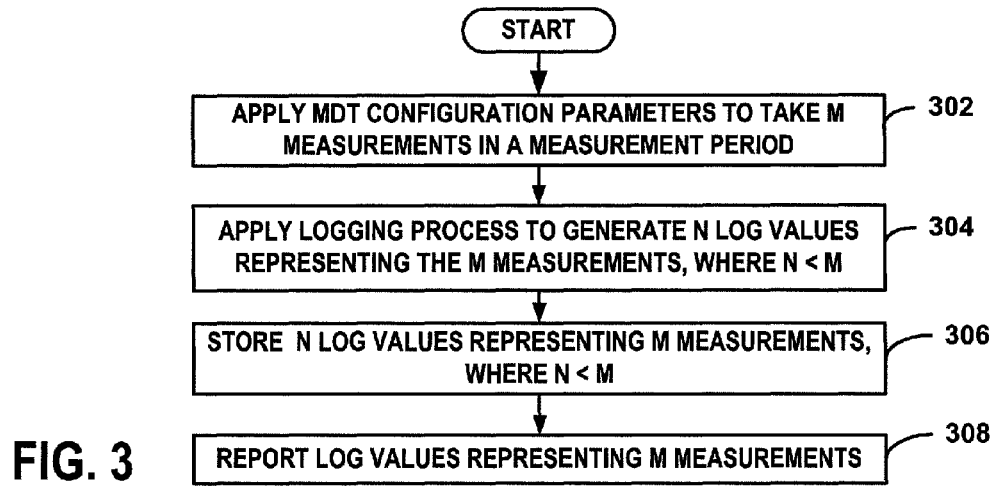
FIG. 3 is a flow chart of a method of performing a MDT procedure at a mobile wireless communication device.

FIG. 3 is a flow chart of a method of performing a MDT procedure at a mobile wireless communication device. Any combination of hardware, software and/or firmware can be used to perform the steps. Although the method is depicted as a sequence of numbered steps for clarity, the numbering does not necessarily dictate the order of the steps. Some of these steps may be skipped, performed in parallel, or performed without the requirement of maintaining a strict order of sequence depending on the particular implementation.

At step 302, the MDT configuration parameters are applied to take a number (M) of measurements 208 within a measurement period 210. The controller 118 configured to receive the appropriate pilot signals. The signal characteristic, such as RSRP or RSRQ is determined.

At step 304, a logging process generates a number (N) of log values from the M number of measurement values, where N is less than M. For at least one implementation, the log values are selected directly from the measured values. Accordingly, for such implementations, not all of the measured values are selected as log values. Some techniques for selecting the log values include determining whether the difference between particular values exceeds a threshold where the values may be measured values, logged values, calculated values and combinations thereof. If the threshold is not exceeded, the measured value is not selected as a log value. In some circumstances, the log values are calculated from the measured values. For example, a log value may be an average of measured values.

A log value, therefore, may be created using any of numerous techniques. In some implementations, the log value is the current measured value. In other situations, the log value is calculated using at least the current measured value and possibly other measured values and/or logged values. An example includes averaging a set of two or more measured values. The selection of measured values for averaging may be based on a predetermined number of measured values. For instance, a log value may be generated for every three measured values. The log value is associated with one of the measurements times. For example, measurements taken at T1, T2, and T3 may be averaged to create a log value that is stored and associated with measurement time, T2.

In other situations, the selection of measurement values to be averaged is based on a trigger event such as a determination that a difference between measured values has exceeded a threshold. The trigger event may be a determination that a difference between an average number of measured values and a previously stored log value exceeds a threshold. An example of an averaging logging process is described below with reference to FIG. 6.

At step 306, the log values are stored in memory. Therefore, the number of stored values representing the measured values is less than the number of measured values. The log values are stored with a time stamp or other time indicator 214 providing information regarding the timing of the measured value or values that the log value represents.

A step 308, the log values are reported to the communication system infrastructure 102. Typically, the mobile wireless communication device reports the log values in response to an instruction or request from the communication system infrastructure. For the examples herein, only the stored values and the associated time stamps or time indicators 214 are transmitted by the transmitter 122 to the base station 106. The communication system infrastructure 102 may further process the received log value information to establish values for measurement times. For example, linear interpolation may be applied to the reported log values to generate values for the measurements times where the mobile wireless communication device 104 did not report a value.

Figure 4:
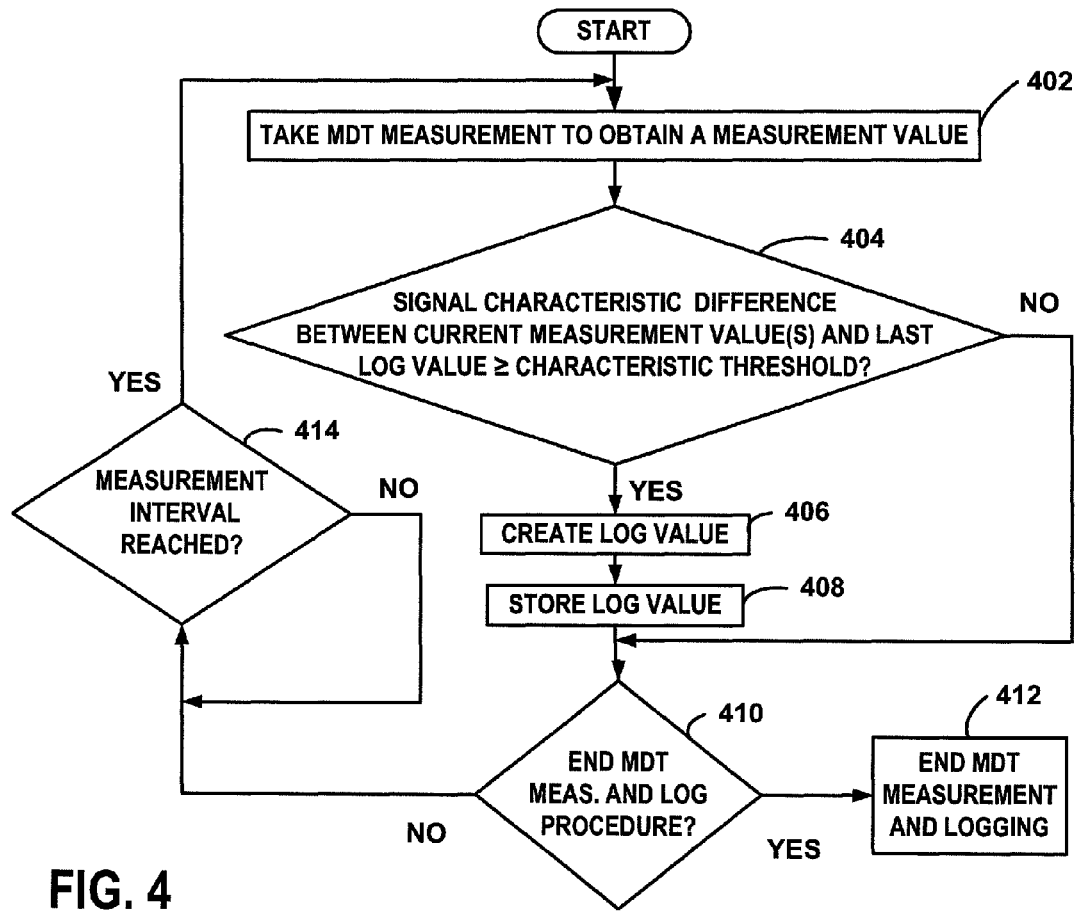
FIG. 4 is a flow chart of a method of performing a MDT procedure at a mobile wireless communication device where the logging process is based on a difference between a current measured value and the last log value.

FIG. 4 is a flow chart of a method of performing a MDT procedure at a mobile wireless communication device where the logging process is based on a difference between a current measured value and the last log value. Any combination of hardware, software and/or firmware can be used to perform the steps. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence depending on the particular implementation.

At step 402, a MDT measurement is taken to obtain a measurement value. The receiver 124, in accordance with direction from the controller 118, receives the appropriate pilot signal. The controller 118 applies the MDT configuration parameters to receive the pilot signal and determine the measured signal characteristic. For example, the signal strength of a received pilot signal is evaluated to determine the RSRP or RSRQ.

At step 404, it is determined whether the difference between signal characteristic measurements is greater than a characteristic threshold. The evaluation is not performed for the first measurement of the test since there is no previous measurement. The controller 118 calculates a difference between the current measurement value and the measurement value corresponding to the last measurement time for which a log value has been (or will be) stored. If the difference is greater than the threshold, a log value is created at step 406. Otherwise, a log value is not created for the measurement time and the method continues at step 410. For example, if the signal characteristic is RSRP and the threshold is 5 dB, the controller only creates a log value when the absolute value of the difference between the currently measured RSRP and the RSRP measurement corresponding to last measurement time where a log value was stored is greater than or equal to 5 dB.

At step 406, a log value is created. As discussed above, the log value may be created using any of numerous techniques. For this example, however, each log value is a measured value.

At step 408, the log value is stored. As discussed above, the each log value is stored with a corresponding time indicator. Since each log value is a measured value in this example, the resulting storage of values resembles a conventional storage in that a measured value is associated with the corresponding time indicator. Less memory is used, however, since some measured values and time indicators are omitted from storage.

At step 410, it is determined whether the measurement and logging portion of the MDT procedure should be terminated. The MDT measurement and logging procedure may end because of any of several reasons. Some examples include reaching the measurement duration indicated by the MDT configuration parameters or a lack of memory. The MDT measurement and logging procedure may also end if the mobile wireless communication device is powered off, the mobile wireless communication device roams to another network with a PLMN that differs from the PLMN that configured the mobile wireless communication device for MDT logging (i.e., device roams to another operator's network) or if a reconfiguration message from the communication system infrastructure 102 with a shorter measurement duration is received. In some situations, the determination of whether the MDT measurement duration has been reached takes into account the measurement interval. If it is determined that the MDT procedure should be terminated, the procedure continues to step 412 where the measurement portion of the MDT measurement and logging procedure is terminated. The log values are typically reported to the communication system infrastructure 102 at this stage. If the MDT measurement and logging procedure has not ended, the procedure continues at step 414.

At step 414, it is determined whether the time elapsed since the last measurement has reached the measurement interval identified by the MDT configuration parameters. If the time interval has been reached, the procedure returns to step 402, where another MDT measurement is taken. Otherwise, the procedure waits until the interval is reached before taking another measurement.

Figure 5:
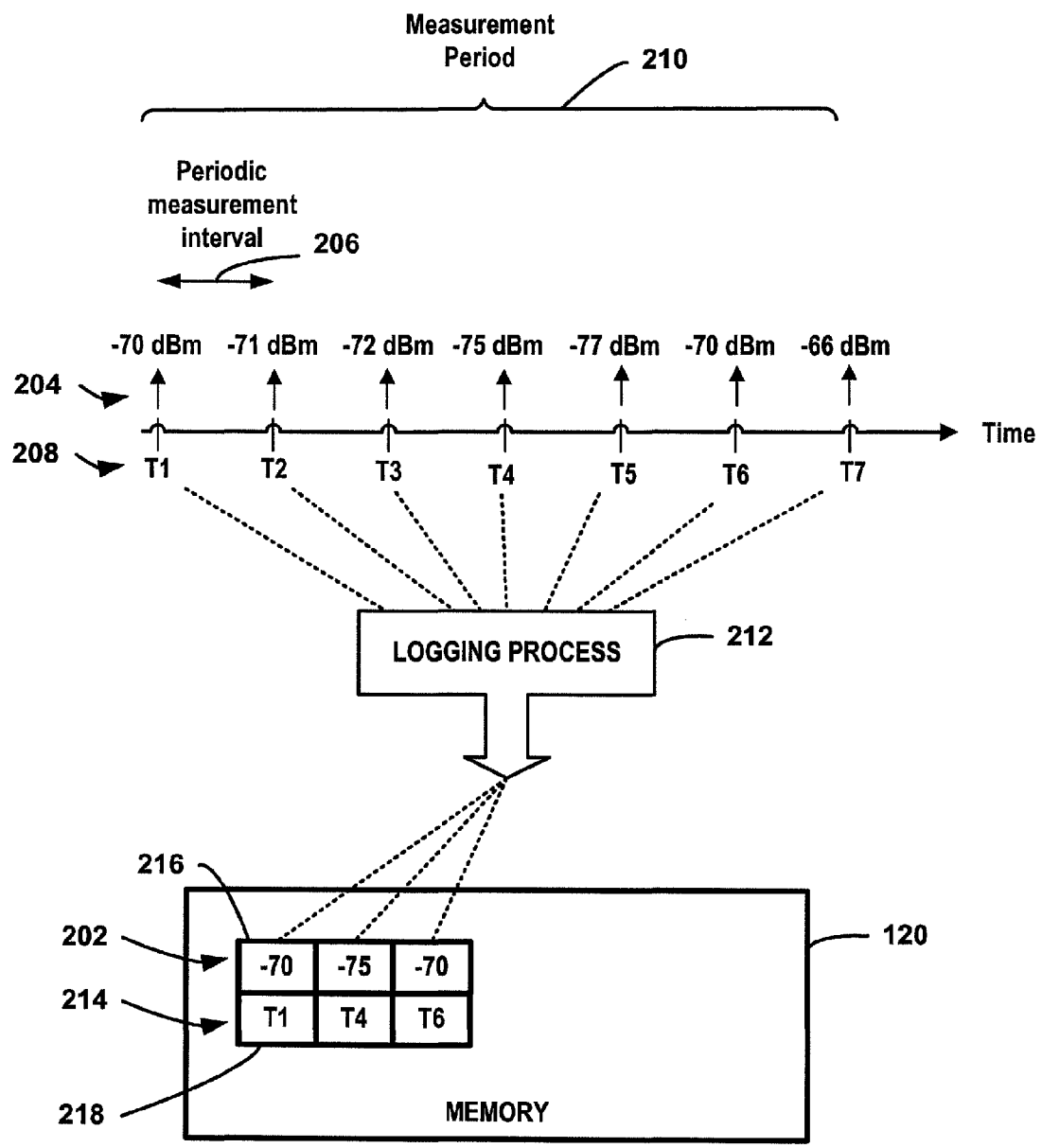
FIG. 5 is a diagram of log values corresponding to MDT measurements for an example where each log value is based on a single MDT measurement value.

FIG. 5 is a diagram of log values corresponding to MDT measurements for an example where each log value is based on a single MDT measurement value. FIG. 5, therefore, is an example of the logging process invoked for the example of FIG. 4. For this example, there are seven measurement times, T1, T2, T3, T4, T5, T6, and T7. Therefore, the controller 118 generates seven measurement values based on the signal characteristic of the pilot signals measured at each measurement time. For this example, the signal characteristic is RSRP and the values for T1, T2, T3, T4, T5, T6, and T7 are −70 dBm, −71 dBm, −72 dBm, −75 dBm, −77 dBm, −70 dBm, and −66 dBm, respectively. The logging process selects the measurement values that will be stored in memory based on a difference between measurement values relative to a threshold. For the example, the threshold is 5 dB. The first measured value −70 dBm is stored as the first log value and is associated with the time stamp (or other timing indicator) corresponding to the first measurement time, T1. The second measurement value and the third measurement values are not stored since the difference between the RSRP of these values and the RSRP of the first measurement value is less than 5 dB. The fourth measurement value, however, is stored since the difference between −75 dBm and −70 dBm is equal to 5 dB. Accordingly, the fourth measurement value (−75 dBm) is associated with the fourth measurement time, T4, and is stored as the second log value in memory. The fifth measurement value is not selected as a log value since the difference between −77 dBm and −75 dBm is less the 5 dB. The sixth measurement value, however, is selected to be stored as the third log value since the difference between −70 dBm and −75 dBm is greater than or equal to 5 dB. The third log value is stored as −70 dBm and associated with the sixth measurement time, T6. The seventh measured value −66 dBm is not selected for storage in memory since the difference between −66 dBm and −70 dBm is less than 5 db.

Figure 6:
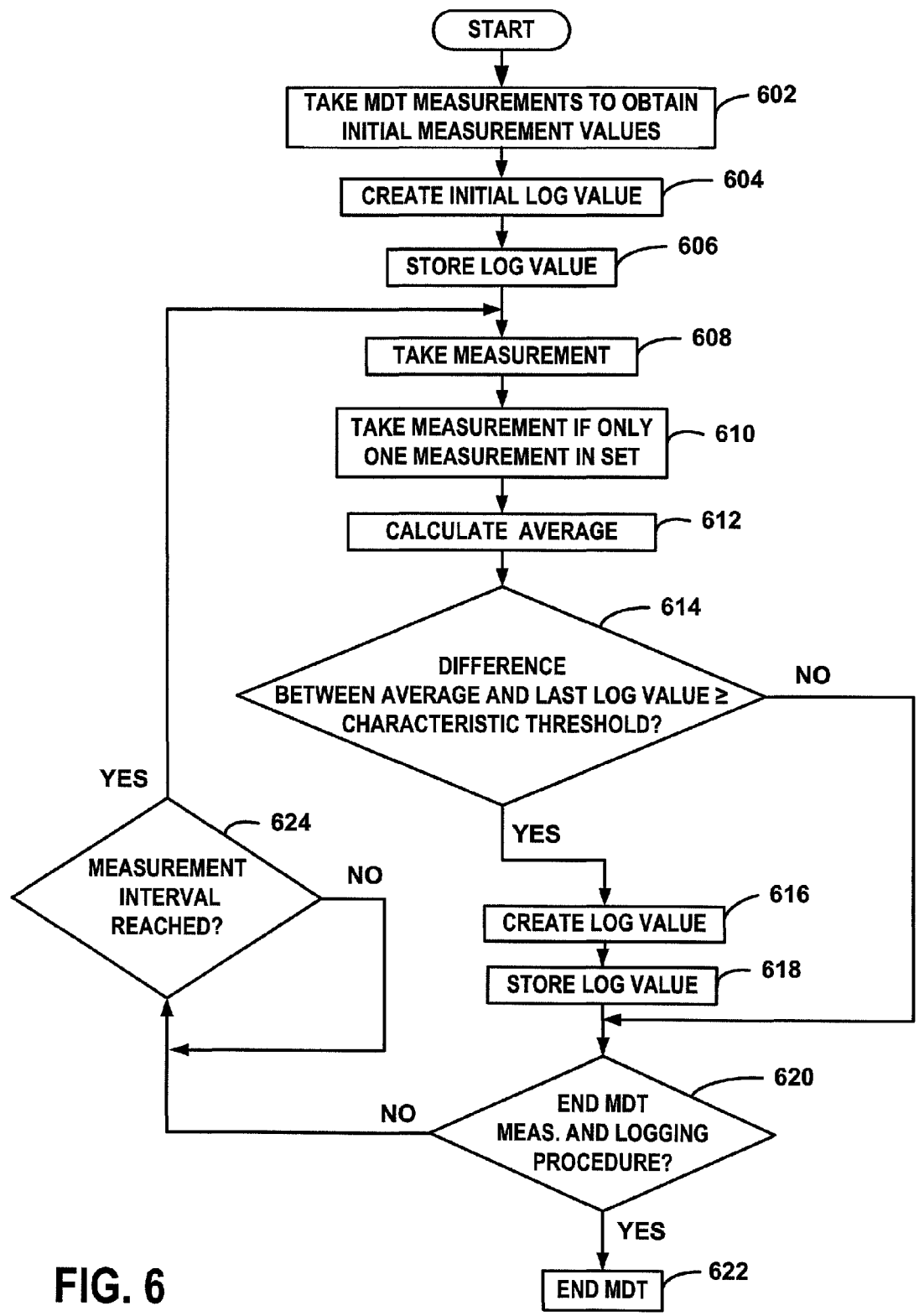
FIG. 6 is a flow chart of a method of performing a MDT procedure at a mobile wireless communication device where the logging process is based on a difference between an average of measured values and the last log value.

FIG. 6 is a flow chart of a method of performing a MDT procedure at a mobile wireless communication device where the logging process is based on a difference between an average of measured values and the last log value. Any combination of hardware, software and/or firmware can be used to perform the steps. Although the method is depicted as a sequence of numbered steps for clarity, the numbering does not necessarily dictate the order of the steps. Some of these steps may be skipped, performed in parallel, or performed without the requirement of maintaining a strict order of sequence depending on the particular implementation.

At step 602, initial MDT measurements are taken to obtain measurement values. The receiver 124, in accordance with direction from the controller 118, receives the appropriate pilot signal. The controller 118 applies the MDT configuration parameters to receive the pilot signal and determine the measured signal characteristic. For example, the signal strengths of received pilot signals are evaluated to determine the RSRP or RSRQ.

At step 604, the initial log value is created. Although any of several techniques may be used to create the first log value, the first log value is an average of the first three measured values for this example. Another suitable example includes using the first measured value as the first log value.

At step 606, the initial log value is stored in memory. The log value is stored with a corresponding time indicator. For the example, the time indicator corresponds to the first measurement time, T1.

At step 608, the next MDT measurement is taken to obtain a MDT measurement value.

At step 610, another MDT measurement is taken to obtain a second MDT measurement value for the set if the set only includes one measurement value. Accordingly, at least two measurements are obtained for each set.

At step 612, an average of the measured values in the set is calculated.

At step 614, it is determined whether the difference between the average of the measured values and the last log value is greater than or equal to a characteristic threshold. The controller calculates a difference between the current average of measurement values for the current set of values and the last created log value. If the difference is greater than or equal to the threshold, a log value is created at step 616. Otherwise, a log value is not created for the measurement time and the method continues at step 620. For example, if the signal characteristic is RSRP and the threshold is 5 dB, the controller only creates a log value when the absolute value of the difference between the average of measured RSRP values and the RSRP measurement corresponding to the last log value is greater than 5 dB.

At step 616, a log value is created. As discussed above, the log value may be created using any of numerous techniques. For this example, however, each log value is the average of measured values for the current set of measured values.

At step 618, the log value is stored. As discussed above, each log value is stored with a corresponding time indicator.

At step 620, it is determined whether the MDT measurement and logging procedure should be terminated. As discussed above, MDT measurement and logging procedure may end because of any of several reasons. In some situations, the determination of whether the MDT measurement duration has been reached takes into account the measurement interval. If it is determined that the MDT measurement and logging procedure should be terminated, the procedure continues to step 622 where the measurement portion of the MDT procedure is terminated. The log values are typically reported to the communication system infrastructure 102 at this stage. If the MDT procedure has not ended, the procedure continues at step 624.

At step 624, it is determined whether the time elapsed since the last measurement has reached the measurement interval identified by the MDT configuration parameters. If the time interval has been reached, the procedure returns to step 608, where another MDT measurement is taken. Otherwise, the procedure waits until the interval is reached before taking another measurement.

Figure 7:
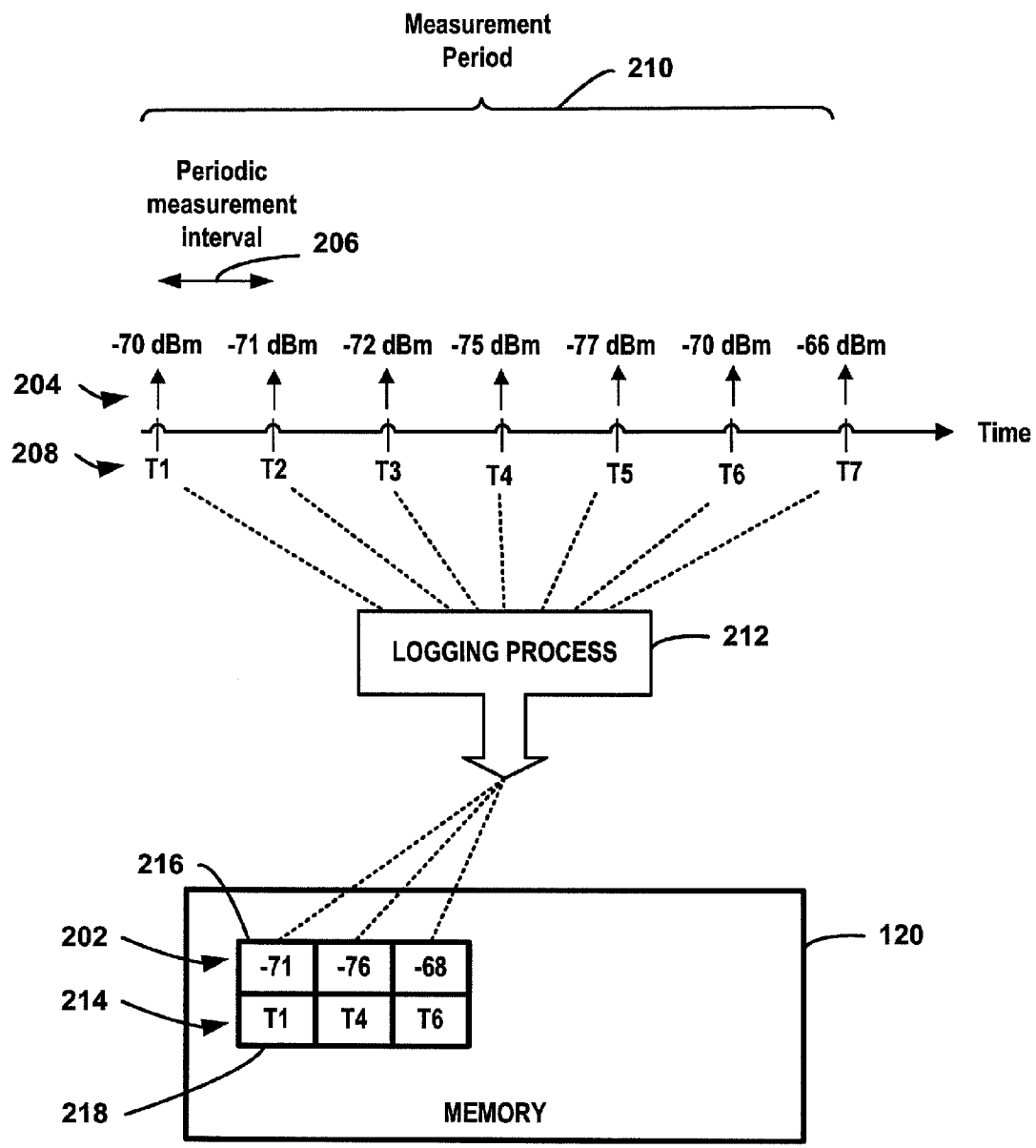
FIG. 7 is a diagram of log values corresponding to MDT measurements for an example where each log value is based on an average of MDT measurement values.

FIG. 7 is a diagram of log values corresponding to MDT measurements for an example where each log value is based on an average of MDT measurement values. The discussion with reference to FIG. 7, therefore, describes an example of the logging process invoked for the example of FIG. 6. As mentioned above, different techniques can be used for selecting the values that will be averaged. For this example, there are seven measurement times, T1, T2, T3, T4, T5, T6, and T7. Therefore, the controller 118 generates seven measurement values based on the signal characteristic of the pilot signals measured at each measurement time. For this example, the signal characteristic is RSRP and the values for T1, T2, T3, T4, T5, T6, and T7 are −70 dBm, −71 dBm, −72 dBm, −75 dBm, −77 dBm, −70 dBm, and −66 dBm, respectively. The logging process averages at least two measured values for each set and compares the average with the last log value. If the difference between the two values is greater than or equal to a threshold, a log value is created from the average. The controller determines which measurement time will be associated with a log value based on a difference between the average of measurement values and the last generated log value relative to a threshold. In other words, for this example, an average of a set of measured values is compared to the last stored log value and, if the difference between the average and the log value is equal to or greater than a threshold, the averaged value is selected as a log value and stored. For the example, the threshold is 5 dB.

An initial log value to be associated with the first measurement time is generated based on an average of the first three measurement values. Other techniques may be used to generate the first log value. The first measurement value may be selected as the first log value, for example. A different number of measurement values may be used for calculating the average. Also, the number of measurement values used for the average may be determined based on a trigger event such as a determination that a measurement value difference has exceeded a threshold. In addition, the first log value may be associated with a measurement time other than T1. For this example, however, the average of the first three measurements occurring at T1, T2, and T3 are averaged and associated with a time indicator corresponding to the first measurement time, T1. Therefore, the average of −70, −71, and −72 is calculated to be −71 and the −71 value is stored with a time indicator of T1.

Since the average of the fourth and fifth measurement values is −76 dBm and the difference between −76 and −71 is equal to the threshold of 5 dB, the average (−76) is stored as the second log value and associated with the forth measurement time, T4. As the MDT procedure continues, the next set of measurement values is compared to the threshold. Since the average of the sixth and seventh measurement values is equal to −68 dBm, and the difference between the last log value (−76 dBm) and the average (−68) meets the threshold, the third log value is created as −68. The third log value is stored with association to the sixth measurement time, T6.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A mobile wireless communication device comprising:
   a memory;
   a receiver configured to receive a control signal and measurement signals, the control signal comprising a minimization drive test (MDT) configuration parameter indicating at least a measurement interval;
   a controller configured to:
     execute a minimization drive test (MDT) comprising measuring a signal characteristic of the measurement signals in accordance with the MDT configuration parameter to generate a measurement number of measurements for a measurement period; and
     log, in the memory, a log number of log values corresponding to at least some of the measurements, the log number being less than the measurement number, at least one log value corresponding to an average of two or more consecutive measurements, the average of the two or more selected measurements compared to a last log value, a new log value created from the average only when a difference between the average and the last log value is greater than or equal to a threshold.

2. The mobile wireless communication device of claim 1, wherein at least one other log value of the log values corresponds to a selected measurement of the measurements.

3. The mobile wireless communication device of claim 1, wherein at least one other log value of the log values is based on two or more selected measurements of the measurements.

4. The mobile wireless communication device of claim 1, wherein the measurement signals are reference signals.

5. The mobile wireless communication device of claim 4, wherein the signal characteristic indicates a quality of the measurement signals.

6. The mobile wireless communication device of claim 5, wherein the signal characteristic is selected from Reference Signal Received Power (RSRP) and Reference Signal Received Quality (RSRQ) value.

7. The mobile wireless communication device of claim 1, wherein the controller is configured to measure the signal characteristic of the measurement signals in accordance with a MDT described by at least one revision of a 3rd Generation Partnership Project (3GPP) specification.

8. The mobile wireless communication device of claim 1, wherein the control signal is a Resource Control (RRC) message and the receiver is configured to receive the MDT configuration parameter within a LoggedMeasurementConfiguration in accordance with at least one revision of a 3rd Generation Partnership Project (3GPP) Long Term Evolution (LTE) specification.

9. A method of performing a minimization of drive test (MDT), the method comprising:
   obtaining a number of MDT measurement values within a measurement period;
   applying a logging process to generate a number of log values representing the MDT measurement values, at least one log value of the number of log values based on two or more consecutive measurements of the MDT measurement values, the average of two or more selected measurements compared to a last log value, a new log value created from the average only when a difference between the average and the last log value is greater than or equal a threshold; and
   logging the log values in memory, the number of log values less than the number of MDT measurement values.

10. The method of claim 9, wherein at least one other log value of the number of log values corresponds to a selected measurement of the MDT measurement values.

11. The method of claim 9, wherein the obtaining a measurement value comprises measuring a signal characteristic of a reference signal.

12. The method of claim 11, wherein the reference signal is a pilot signal and the signal characteristic indicates a quality of the pilot signal.

13. The method of claim 12, wherein the signal characteristic is selected from Reference Signal Received Power (RSRP) and Reference Signal Received Quality (RSRQ) values.

14. The method of claim 11, further comprising:
   measuring the signal characteristic of the pilot signals in accordance with a MDT described by at least one revision of a 3rd Generation Partnership Project (3GPP) specification.

15. The method of claim 9, further comprising receiving a measurement interval parameter indicating a measurement interval between measurements, the measurement interval parameter transmitted from a base station within a LoggedMeasurementConfiguration message in accordance with at least one revision of a 3rd Generation Partnership Project (3GPP) Long Term Evolution (LTE) specification.

* * * * *